United States Patent [19]
Holbrook

[11] 3,954,032
[45] May 4, 1976

[54] CITRUS PEEL OIL EXTRACTOR FOR WHOLE FRUIT

[75] Inventor: Franklin K. Holbrook, Whittier, Calif.

[73] Assignee: Brown International Corporation, Covina, Calif.

[22] Filed: Dec. 3, 1973

[21] Appl. No.: 421,104

Related U.S. Application Data

[63] Continuation-in-part of Ser. No. 207,482, Dec. 13, 1971, abandoned.

[52] U.S. Cl. .......................................... 83/2; 99/495; 99/509; 198/221
[51] Int. Cl.² ........................ A23N 1/00; A47J 19/02
[58] Field of Search ............ 83/2; 99/495, 501, 509, 99/485; 198/221; 259/DIG. 24

[56] References Cited
UNITED STATES PATENTS

| | | | |
|---|---|---|---|
| 1,116,880 | 11/1914 | Giampietro | 99/495 |
| 1,734,534 | 11/1929 | Shields | 99/485 |
| 2,289,851 | 7/1942 | Maxcy | 99/495 |
| 2,527,364 | 10/1950 | Koffler | 99/495 |
| 3,183,825 | 5/1965 | James | 99/509 |
| 3,707,176 | 12/1972 | Bushman | 83/2 |

*Primary Examiner*—Billy J. Wilhite
*Attorney, Agent, or Firm*—Lyon & Lyon

[57] ABSTRACT

Pairs of toothed rolls form bights or troughs for reception of whole lemons or other citrus fruit. The rolls turn in the same direction, one roll of each pair turning at higher speed. An axially extending bar moves in an orbit above the faster roll of each pair to contact the fruit intermittently to move it out of the bight between the rolls and into contact with a stationary inclined wall adjacent the slower of the rolls. The motion of the bar moves the fruit axially along the wall to re-enter the bight at an axially spaced location. A pool of water submerges the toothed rolls so that the sharp teeth on the peripheries of the rolls puncture the oil cells in the peel of the fruit to release the oil into the water without seriously damaging the fruit. A single oscillating mechanism provides orbital movement for two parallel bars, each bar cooperating with a pair of toothed rolls.

8 Claims, 10 Drawing Figures

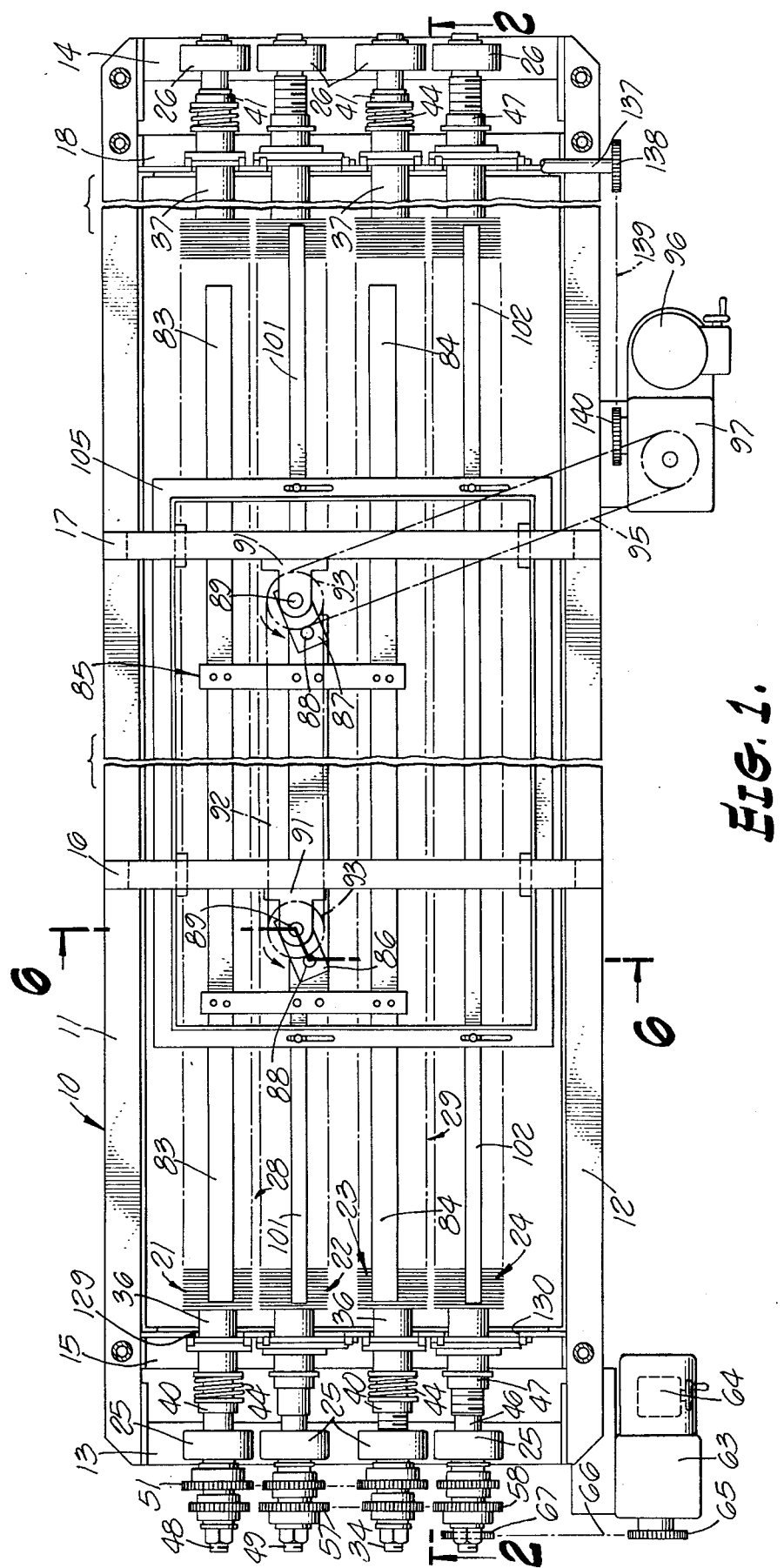

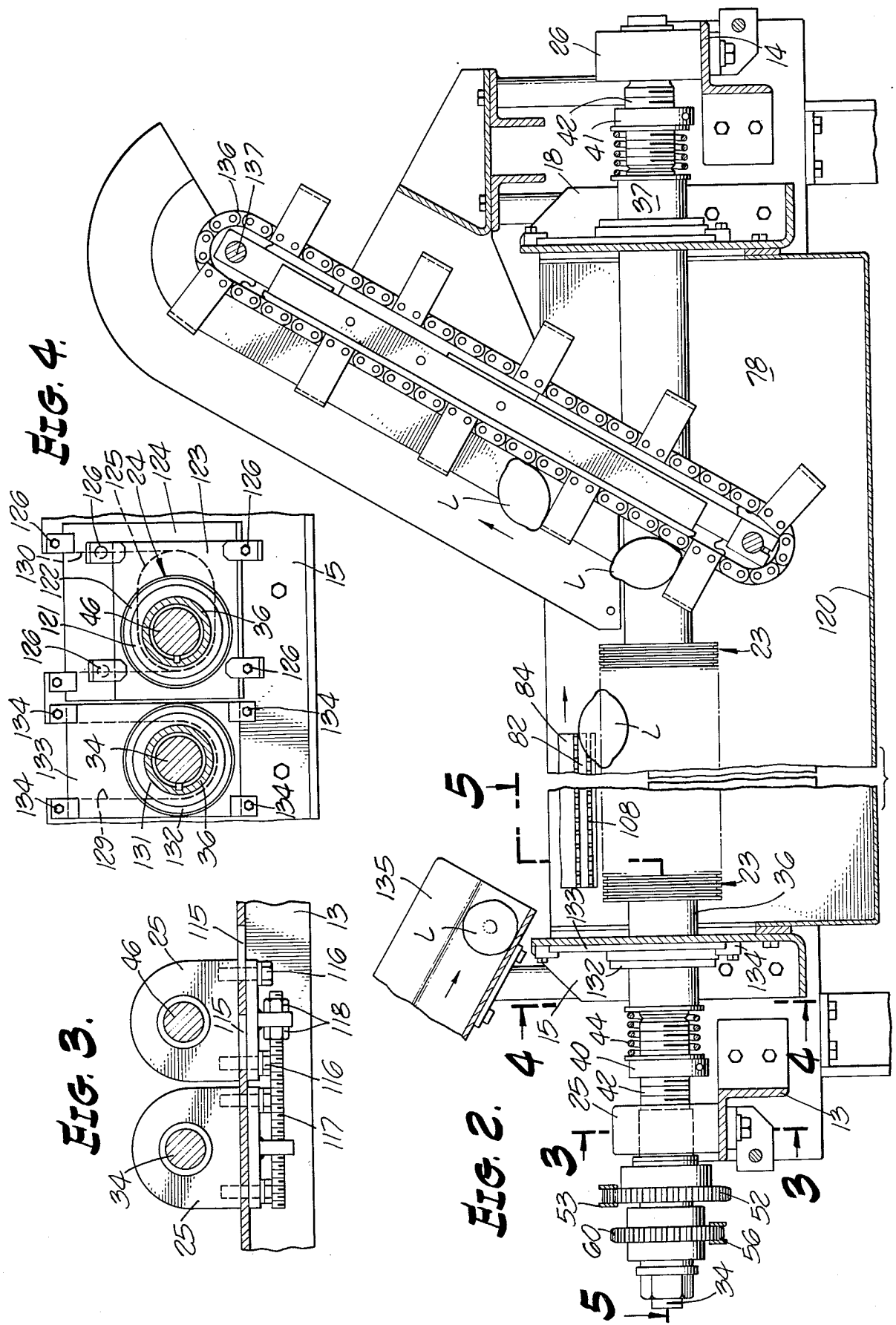

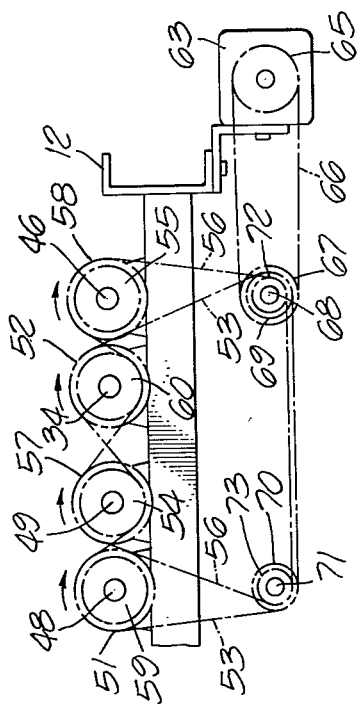
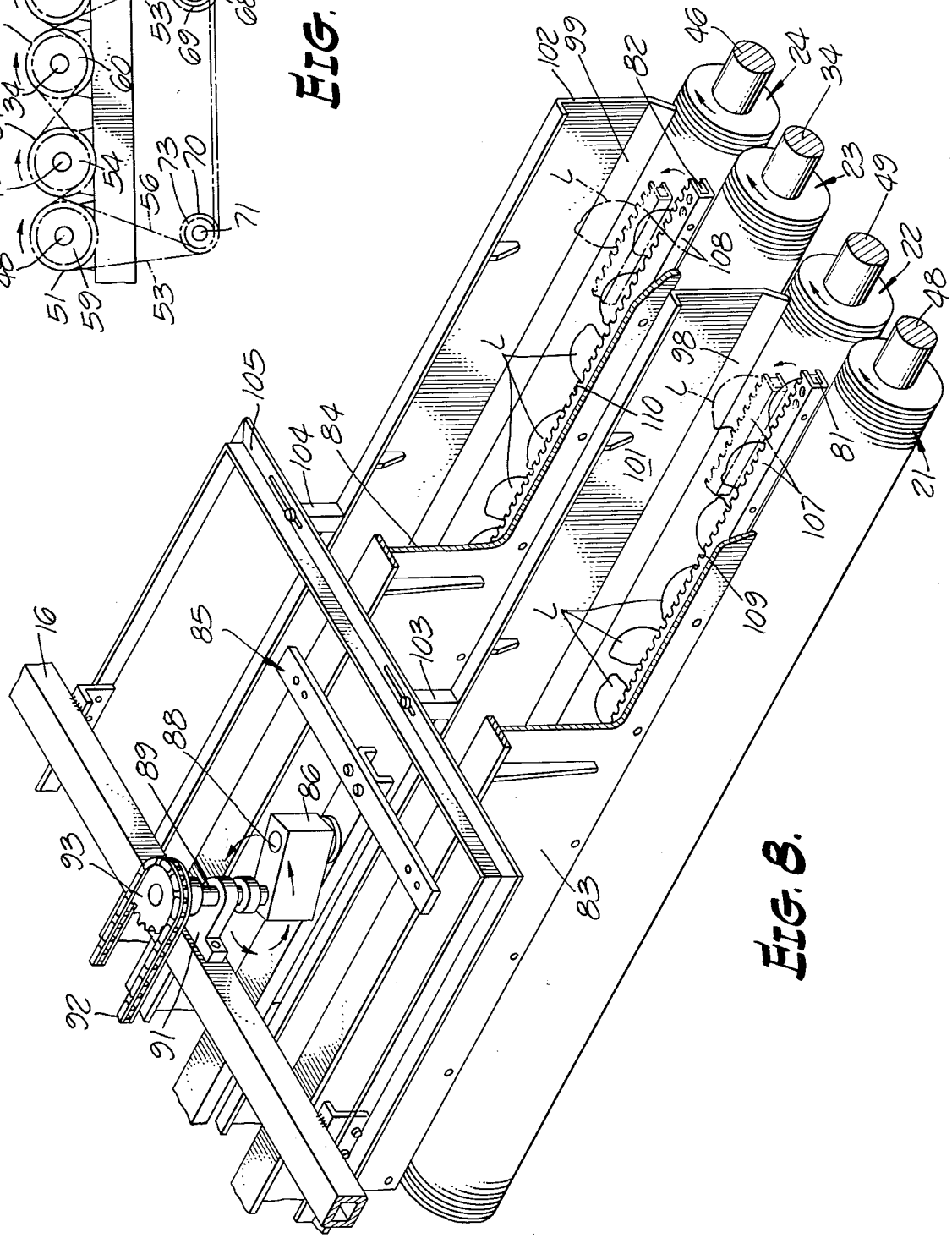
Fig. 7.
Fig. 8.

CITRUS PEEL OIL EXTRACTOR FOR WHOLE FRUIT

This application is a continuation-in-part of copending application Ser. No. 207,482 filed Dec. 13, 1971 entitled CITRUS PEEL OIL EXTRACTOR FOR WHOLE FRUIT, now abandoned.

This invention relates to apparatus for extracting oil from the peel or rind of whole citrus fruit such as lemons, oranges, grapefruit, or tangerines. The peel oil is extracted from the rind before the juice is extracted from the interior of the fruit, in order to obtain maximum recovery of the peel oil and to avoid loss of the oil during the juice extraction process.

This invention relates to improvements over the apparatus shown in the copending application of Ronald C. Bushman Ser. No. 101,590 filed Dec. 28, 1970, now U.S. Pat. No. 3,707,176 issued Dec. 26, 1972 and entitled "Apparatus for Extracting Citrus Peel Oil from Whole Fruit." An important feature of the present invention lies in the provision of an improved mechanism for advancing the fruit axially along the toothed rolls, instead of transferring the fruit laterally to contact a series of pairs of rolls. The fruit advancing mechanism of the present invention results in a higher percentage recovery of the peel oil and at the same time results in less damage to the rind of the fruit. Less damage to the fruit results in a more efficient juice extraction operation, the latter taking place after the removal of the peel oil from the whole fruit.

Each pair of toothed rolls is provided with an axially extending bar which travels in an orbit above one of the rolls and a stationary inclined wall which is positioned above the other of each pair of rolls. The orbital movement of the axially extending bar dislodges fruit from the bight between the rolls and moves it laterally into contact with the stationary inclined wall and then axially along the wall and then permits the fruit to re-enter the bight at an axially spaced location. Two or more pairs of toothed rolls each with its oscillating bar may be employed in order to provide a machine of the desired capacity.

Other and more detailed objects and advantages will appear hereinafter.

In the drawings:

FIG. 1 is a top plan view partly broken away, showing a preferred embodiment of this invention.

FIG. 2 is a sectional side elevation taken substantially on the lines 2—2 as shown in FIG. 1.

FIG. 3 is a sectional detail taken substantially on the lines 3—3 as shown on FIG. 2.

FIG. 4 is a sectional detail taken substantially on the lines 4—4 as shown on FIG. 2.

FIG. 7 is a diagrammatic end view partly broken away, showing the manner of driving the pairs of toothed rolls.

FIG. 8 is a perspective view partly broken away, showing details of construction and operation of the oscillating bar assembly.

Figure 5:
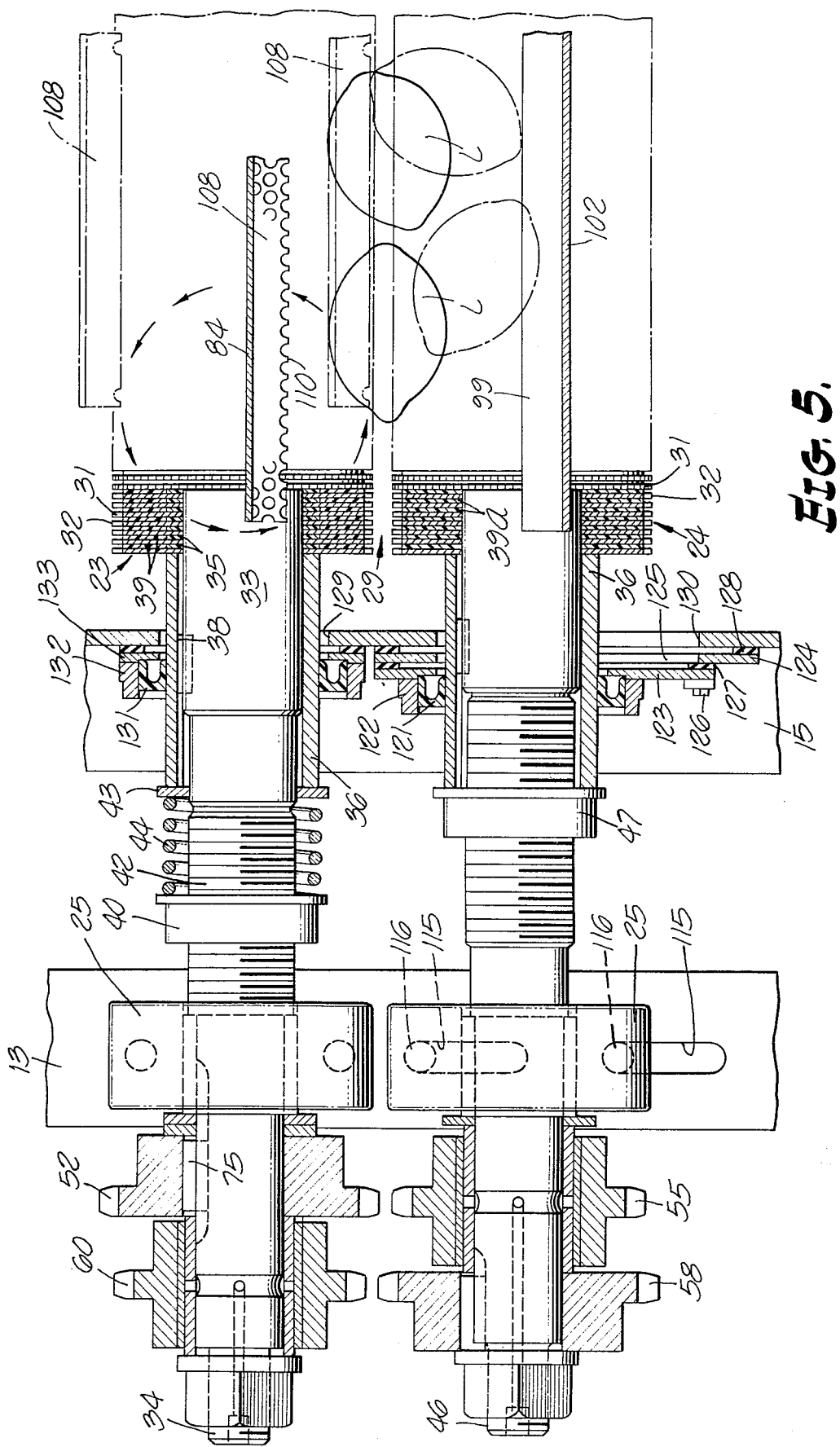
FIG. 5 is a sectional plan view taken substantially on the lines 5—5 as shown on FIG. 2.

Referring to the drawings, a stationary frame generally designated 10 includes parallel side members 11 and 12 and parallel end members 13 and 14. Cross members 15, 16, 17 and 18 of the frame are parallel to the end members. Rolls 21, 22, 23 and 24 each extend for the full length of the frame and are supported at their ends by means of bearings 25 resting on end member 13 and bearings 26 resting on end member 14. Rolls 21 and 22 operate as a pair and form a bight 28 between them. Similarly, rolls 23 and 24 operate as a pair and form a bight 29 between them.

Rolls 21 and 23 are duplicates and therefore only one need be described in detail. Considering roll 23, a plurality of duplicate annular disks 31 each having a toothed periphery 32 are slidably received upon a cylindrical portion 33 of the rotary shaft 34. The disks 31 are formed of metal and are separated by non-metallic spacers 35. Annular plastic washers 39, slightly thinner than the spacers 35, encircle the spacers 35 to limit the depth of penetration of the teeth on the periphery of the disks 31. The toothed disks 31 and spacers 35 are clamped between sleeves 36 and 37 which encircle the shaft 34 and which are connected by keys 38 to rotate therewith. Nuts 40 and 41 are mounted on threaded portions 42 of the shaft 34. A washer 43 abuts one end of each sleeve 36 and a coil compression spring 44 is positioned between each nut 40 and each washer 43, so that the toothed disks 31 and spacers 35 are resiliently clamped together endwise by the force of the compression springs 44. From this description it will be understood that the toothed disks on the rolls 21 and 23 are resiliently clamped to their respective shafts by the force of the springs, but any one or more of the individual disks 31 is free to have relative turning motion with respect to its shaft in the event that the frictional force between the disks 31 and their spacers 35 is overcome.

The rolls 22 and 24 are duplicates and therefore only one need be described. Considering roll 24, the annular metallic disks 31 are the same as those employed on roll 23 and have the same toothed peripheries 32 but are spaced by plastic annular washers 39a which encircle the shaft 46 and limit the depth of penetration of the teeth. However, no springs are employed to hold the disks 31 frictionally with respect to the shaft 46; instead, the nuts 47 on the shaft 46 directly engage the sleeves 36 and 37 to clamp the toothed disks 31 and washers 39a tightly between them so that relative motion is not permitted. From this description it will be understood that the rolls 22 and 24 employ toothed disks 31 separated by washers 39a and clamped tightly together endwise to prevent relative turning movement between the disks and their supporting shafts.

The shafts 48 and 34 having the spring-loaded rolls 21 and 23 are driven at high speed, and the shafts 49 and 46 having the rolls 22 and 24 are driven at a slower speed. The high speed shafts 48 and 34 each turn at about twice the speed of the slow speed shafts 49 and 46. As shown on FIGS. 1, 2 5 and 7 sprockets 51 and 52 on shafts 48 and 34, respectively are driven by high speed chain 53 which also passes under idler sprockets 54 and 55 on shafts 49 and 46, respectively. The slow speed chain 56 drives sprockets 57 and 58 fixed to shafts 49 and 46, respectively, and this slow speed chain 56 passes under idler sprockets 59 and 60 on shafts 48 and 34, respectively. An electric motor 63 mounted on the frame 10 is provided with a speed adjusting device 64 for regulating the speed of the drive sprocket 65. Chain 55 connects sprocket 65 to driven sprocket 67 mounted on stub shaft 68. The high speed chain 53 passes over sprockets 69 and 70 fixed on the stub shafts 68 and 71, respectively. The low speed chain 56 passes over sprockets 72 and 73 fixed on the stub shafts 68 and 71, respectively. The sprockets 69 and 70 are larger than sprockets 72 and 73, so that the chain 53 is driven at a higher speed than the chain 56.

The driven sprockets 51, 57, 52 and 58 are connected to their respective shafts 48, 49, 34 and 46, respectively, by means of keys 75 (see FIG. 5). The idler sprockets 59, 54, 60 and 55 are rotatably mounted on their respective shafts 48, 49, 34 and 46.

Figure 6:
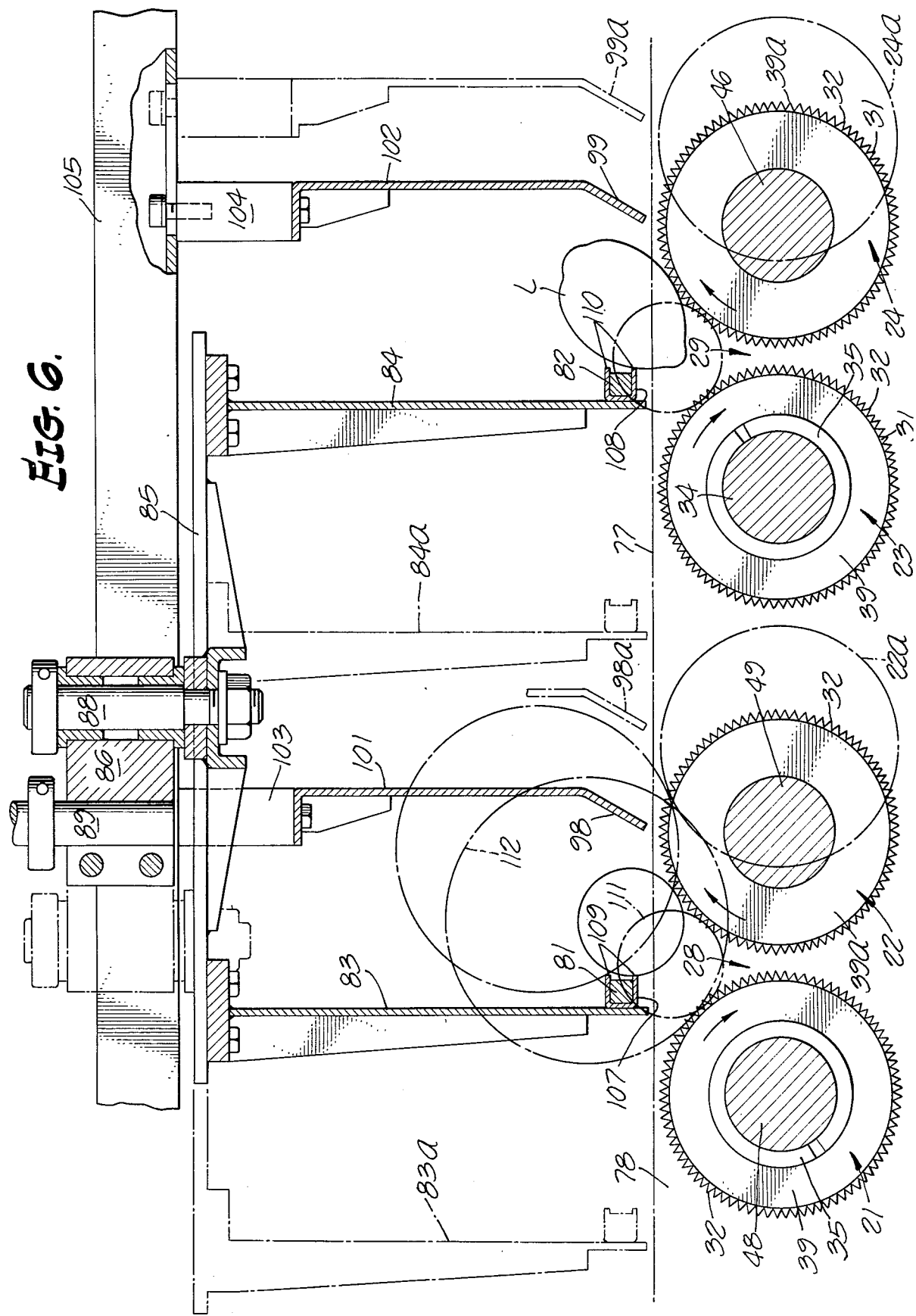
FIG. 6 is a sectional elevation taken substantially on the lines 6—6 as shown on FIG. 1.

In the general plan of operation whole citrus fruit such as lemons, oranges, grapefruit or tangerines are deposited in the bight 28 between the toothed rolls 21 and 22 and in the bight 29 between the toothed rolls 23 and 24. The rolls all turn in the same direction but the roll 21 turns faster than the roll 22, and the roll 23 turns faster than the roll 24. The whole fruit, as shown in the drawings as lemons "L" rest in the bights 28 and 29 on adjacent toothed rolls. The sharp teeth on the peripheries 32 of the individual disks 31 puncture the oil cells in the peel of the fruit to release the oil into a pool of water 78 without seriously damaging the fruit. It is important that the damage be held to a minimum because the fruit will subsequently be halved and the juice extracted from the interior thereof. Each whole fruit rolls in the bight 28 or 29 as the teeth on the disks 31 puncture the oil cells in the peel at a location below the water level 77 (FIG. 6).

Means are provided for advancing the fruit axially along the toothed rolls in the bights 28 and 29. This axial advancing motion takes place from left to right, as viewed in FIGS. 1, 2 and 5 and right to left as viewed in FIG. 8 of the drawings. In accordance with this invention, the advancing means takes the form of axially extending oscillating bars 81 and 82 cooperating with the bights 28 and 29, respectively. The bar 81 is positioned above the fast roll 21 and the parallel bar 82 is positioned above the fast roll 23. Each bar is mounted on a longitudinal member 83, 84 comprising a portion of an oscillating carrier generally designated 85. The carrier 85 is supported and moved in an orbit by means of crank arms 86 and 87. Each crank arm is connected to the carrier 85 by means of an upright pivot pin 88 and is fixed to a parallel crank shaft 89 supported on a frame cross member by means of bearing support 91. A belt or chain 92 connects the pulleys or sprockets 93. Each pulley or sprocket 92 is fixed to its crank shaft 89 and one of the shafts 89 is driven by chain 95 from a variable speed motor 96 driving through a speed reducer 97 mounted on frame 10.

As the crank arms 86 and 87 rotate in unison, they cause the carrier 85 to move through a circular orbit. This orbital motion of the axially extending bars 81 and 82 serves to dislodge the fruit from the bights 28 and 29 to move it laterally against the stationary inclined walls 98 and 99. These walls are positioned along the lower edge of stationary supports 101 and 102, respectively, and supported on spacers 103, 104 bolted to a stationary subframe 105. This stationary subframe is supported on the frame cross members 16 and 17. After dislodging the fruit laterally and moving it against the stationary inclined walls 98, 99, the axially extending bars 81, 82 continue their orbital motion to cause the fruit to move axially along the walls 98, 99, and then return to the bight 28, 29, at an axially spaced location.

The phantom lines 83a and 84a show the positions of the parts at the other end of their strokes.

During the time interval while the fruit lies in the bight 28 and 29, the sharp peripheries 32 of the individual disks 31 puncture the oil cells in the rind as the fruit spins between the turning rolls. As set forth in the copending application of Ronald C. Bushman, Ser. No. 101,590, each lemon L is driven downward into the bight by the action of the fast rolls 21, 23, as compared to the slow rolls 22 and 24. The drive to the individual toothed disks 31 on these fast rolls 21 and 23, however, is not a positive drive but on the contrary the disks may slip relative to their supporting shafts 48, 34. Severe damage to the rind of the lemon L is avoided. It will be noted that the puncturing action of the toothed rolls on the outer surface of the lemons L takes place below the water level 77, thus minimizing escape of volatile peel oil into the air.

If desired, each oscillating bar 81 and 82 may be partially enclosed within a U-shaped channel 107, 108 formed of screen material having large size apertures. The top and bottom portions of each channel may be cut on one edge to intersect the apertures and provide rough non-slip edges 109, 110 for contact with the outer surface of the lemons L.

Means are provided for adjusting the apparatus to accommodate citrus fruit in a wide range of sizes. As shown in FIG. 6, the roll 22 may be laterally adjusted to the phantom line position shown at 22a and the roll 24 may be moved to the phantom line position shown at 24a. Similarly, the stationary wall 98 may be moved to the phantom line position shown at 98a and the stationary wall 99 may be moved to the phantom line position shown at 99a. Thus, by varying the spacing of the pairs of rolls and by changing the position of the stationary inclinded walls, citrus fruit as small as that indicated at 111 or as large as that indicated at 112 may be used.

As shown in FIG. 3, bearings for the shaft 46 may be moved laterally with respect to the end member 13 of the frame. Slots 115 in the end member permit the clamp bolts 116 to move laterally and the adjusting screw 117 and nuts 118 hold the shaft 46 in the desired position. Lateral adjustment of the shafts 46 and 49 requires means to prevent leakage where the shafts pass into the receptacle 120 which contains the pool of water 78. As best shown in FIGS. 4 and 5, the sleeve 36 which encircles the shaft 46 passes through an elastromeric seal ring 121 mounted in a ring 122 secured to a plate 123. A second plate 124 is provided with an oblong aperture 125. The plate 123 is secured to the plate 124 by means of clamp fasteners 126 and a seal ring 127 prevents leakage between the plates 123 and 124. A second seal ring 128 is positioned between the plate 124 and the frame cross member 15. As shown in FIGS. 1, 4 and 5, the cross members 15 and 18 are each provided with upward opening slots 129 for reception of shafts 34 and 48 and upward opening slots 130 for reception of shafts 46 and 49. Water in the pool 78 is prevented from leaking outward by means of the seal rings 121, 127 and 128. The same type of adjustable sealed joint is employed at the other end of the shaft 46 where it passes through the receptacle 120. Also, the shaft 49 is provided with the same type of adjustable seals at both ends.

The shafts 34 and 48, which are not laterally adjustable, pass through the seal rings 131 in stationary rings 132 to locations where they enter the receptacle 120.

The rings 132 are fixed to plates 133 and clamped in position by means of clamp fasteners 134.

Conveyor means are provided for delivering whole citrus fruit to the bights 28, 29 between the pairs of rolls 21, 22 and 23, 24. As shown in FIG. 2, an inclined chute 135 delivers fruit L to each of the bights 28 and 29 and a discharge conveyor 136 at the other end of the device removes the fruit from the bights. The discharge conveyor 136 is driven from shaft 137 which in turn is driven from sprocket 138 (FIG. 1) and chain 139 from sprocket 140. The sprocket 140 is driven from the same reduction gear 97 that drives the oscillating assembly 85 and longitudinal bars 81 and 82.

Figure 9:
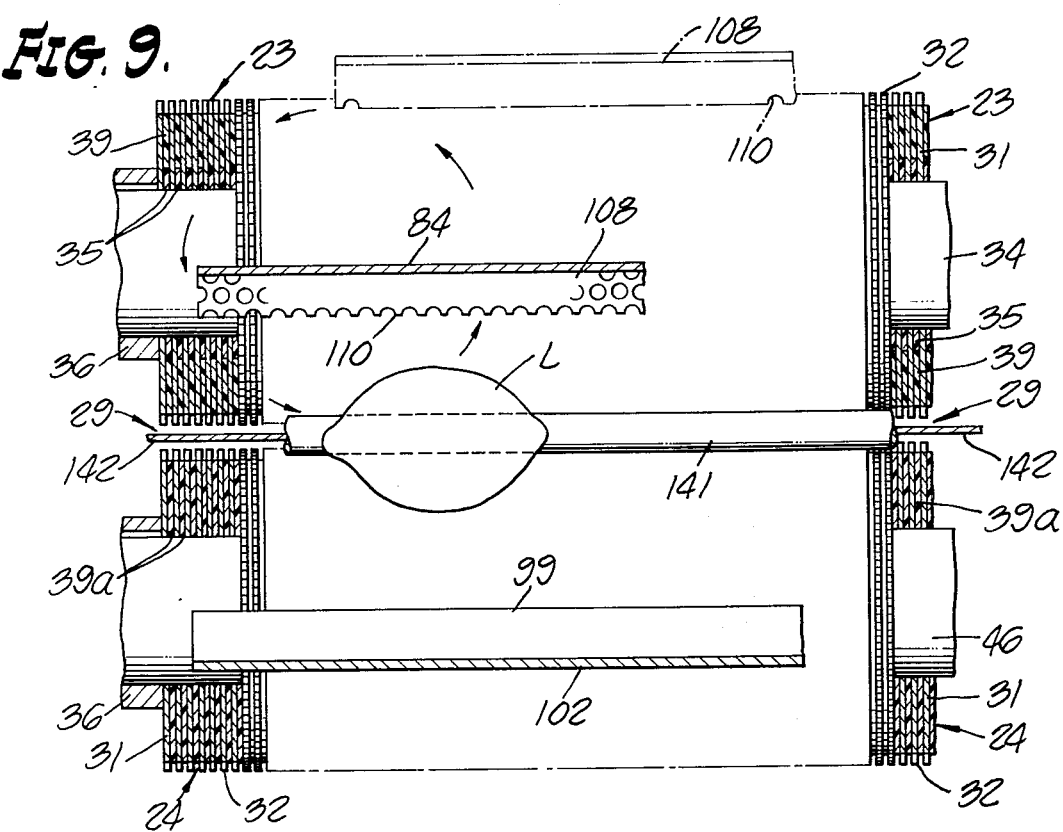
FIG. 9 is a fragmentary sectional view, similar to FIG. 5, showing a modified embodiment involving a stop means interposed between pairs of rolls.
Figure 10:
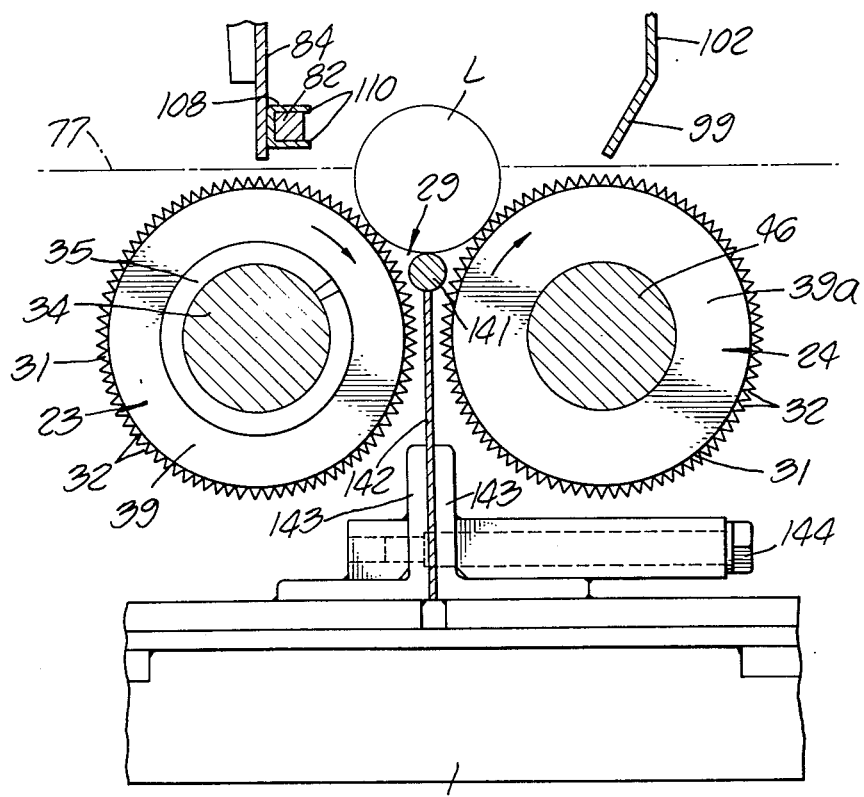
FIG. 10 is a fragmentary sectional view, similar to FIG. 6, also showing the modified embodiment.

Reference is now directed to FIGS. 9 and 10. The construction here shown is the same as the previously described embodiment to which has been added a lemon engaging stop bar 141 in the bight 29 between each pair of rolls, the bar being shown between rolls 23 and 24. The bar is supported by web member 142 clamped between a pair of bracket members 143 secured to and extending between the end member 143 and a cross member 15 of the frame 10. The bracket members 143 are secured together by bolts 144 extending under one of the rolls to an accessible region.

Each stop bar 141 extends the length of the rolls and it is positioned so as to be engaged principally by undersize fruit so as to prevent its being wedged between the rolls or undergo excessive tearing of the rind.

Having fully described my invention, it is to be understood that I am not to be limited to the details herein set forth, but that my invention is of the full scope of the appended claims.

I claim:

1. Apparatus for extracting oil from the peel of whole citrus fruit, comprising in combination: a pair of parallel horizontal toothed rolls forming a bight between them for reception and support of whole citrus fruit, means for rotating said rolls in the same direction to spin the fruit, an axially extending stationary inclined wall adjacent one of said rolls, and an axially extending bar mounted to travel in an orbital path over said bight, in a plane generally parallel to the plane containing the axes of said rolls and at an elevation above said bight to engage fruit thereon, means for moving said bar in said orbital path whereby said bar will contact the fruit intermittently above the rolls to move the fruit out of the bight into contact and axially along said wall to re-enter the same bight at an axially spaced location.

2. The combination as set forth in claim 1, in which a stop means is disposed in the bight between the pair of rolls and positioned for engagement by at least the smaller citrus fruit, to prevent excessive tearing of the rind.

3. The combination set forth in claim 1, in which said orbit is circular.

4. Apparatus for extracting oil from the peel of whole citrus fruit, comprising in combination: a pair of parallel horizontal toothed rolls forming a bight between them for reception and support of whole citrus fruit, means for rotating said rolls in the same direction to spin the fruit, said means acting to rotate one of the rolls faster than the other, an axially extending stationary inclined wall adjacent the slower roll, and an axially extending bar mounted to travel in an orbital path over said bight, in a plane generally parallel to the plane containing the axis of said rolls and at an elevation above said bight to engage fruit thereon, means for moving said bar in said orbital path whereby said bar will contact the fruit intermittently to move the fruit out of the bight into contact and axially along said wall to re-enter the same bight at an axially spaced location.

5. Apparatus for extracting oil from the peel of whole citrus fruit, comprising in combination: a stationary frame, a pair of parallel horizontal toothed rolls forming a bight between them for reception and support of whole citrus fruit, bearing means for rotatably supporting said rolls on said frame, means for rotating said rolls in the same direction to spin the fruit, an axially extending stationary inclined wall adjacent one of said rolls, an axially extending bar, crank arm means on the frame supporting the bar to cause said bar to travel in an orbital path over said bight, in a plane generally parallel to the plane containing the axes of said rolls and at an elevation above said bight to engage fruit thereon, means for moving said bar in said orbital path whereby said bar will contact the fruit intermittently to move it out of the bight into contact and axially along said wall to re-enter the same bight at an axially spaced location, and means on the frame for adjusting the spacing of said bearing means to vary the width of the bight.

6. Apparatus for extracting oil from the peel of whole citrus fruit, comprising in combination: a stationary frame, a pair of parallel horizontal toothed rolls forming a bight between them for reception and support of whole citrus fruit, means for rotatably supporting said rolls on said frame, means for rotating said rolls in the same direction to spin the fruit, walls on said frame forming a container for a pool of liquid submerging said rolls, an axially extending stationary inclined wall adjacent one of said rolls, an axially extending bar, crank arm means on the frame supporting the bar above the pool to cause said bar to travel in an orbital path over said bight, in a plane generally parallel to the plane containing the axes of said rolls and at an elevation above said bight to engage fruit thereon, means for moving said bar in said orbital path whereby said bar will contact the fruit intermittently to move it out of the bight into contact and axially along said wall to re-enter the same bight at an axially spaced location.

7. Apparatus for extracting oil from the peel of whole citrus fruit, comprising in combination: a stationary frame, a pair of parallel horizontal toothed rolls forming a bight between them for reception and support of whole citrus fruit, means for rotatably supporting said rolls on said frame, means for rotating said rolls in the same direction to spin the fruit, said means acting to rotate one of said rolls faster than the other, walls on said frame forming a container for a pool of liquid submerging said rolls, an axially extending stationary inclined wall adjacent the slower of said rolls, an axially extending bar adjacent the faster of the rolls, crank arm means on the frame supporting the bar above the pool to cause said bar to travel in an orbital path over said bight, in a plane generally parallel to the plane containing the axes of said rolls and at an elevation above said bight to engage fruit thereon, means for moving said bar in said orbital path whereby said bar will contact the fruit intermittently to move it out of the bight into contact and axially along said wall to re-enter the same bight at an axially spaced location.

8. Apparatus for extracting oil from the peel of whole citrus fruit, comprising in combination: a pair of parallel horizontal toothed rolls forming a bight between them for reception and support of whole citrus fruit, a stop bar disposed in the bight between the pair of rolls and positioned for engagement by at least the smaller citrus fruit received in the bight thereby to limit the depth of movement of the fruit between the rolls, means for rotating said rolls in the same direction to spin the fruit, said means acting to rotate one of the rolls faster than the other, an axially extending stationary inclined wall adjacent the slower roll, and an axially extending bar mounted to travel in an orbital path over said bight, and contact the fruit intermittently to move the fruit out of the bight into contact with and axially along said wall to re-enter the same bight at an axially spaced location.

* * * * *